United States Patent
Khatri et al.

(10) Patent No.: US 10,706,153 B2
(45) Date of Patent: Jul. 7, 2020

(54) PREVENTING MALICIOUS CRYPTOGRAPHIC ERASURE OF STORAGE DEVICES

(71) Applicant: Dell Products L.P., Round Rock, TX (US)

(72) Inventors: Mukund Khatri, Austin, TX (US); David Michael Pereira, Austin, TX (US); Chandrashekar Nelogal, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 232 days.

(21) Appl. No.: 15/605,073

(22) Filed: May 25, 2017

(65) Prior Publication Data

US 2018/0341773 A1 Nov. 29, 2018

(51) Int. Cl.
*G06F 21/57* (2013.01)
*G06F 21/60* (2013.01)
*G06F 21/78* (2013.01)
*H04L 9/00* (2006.01)
*H04L 9/08* (2006.01)

(52) U.S. Cl.
CPC .......... *G06F 21/575* (2013.01); *G06F 21/602* (2013.01); *G06F 21/78* (2013.01); *H04L 9/002* (2013.01); *H04L 9/0894* (2013.01)

(58) Field of Classification Search
CPC .... G06F 21/575; G06F 21/5757; G06F 21/88; H04L 9/002; H04L 2209/00
See application file for complete search history.

(56) References Cited

U.S. PATENT DOCUMENTS

| | | | |
|---|---|---|---|
| 2004/0188710 A1* | 9/2004 | Koren | G11C 16/102 257/197 |
| 2012/0093318 A1* | 4/2012 | Obukhov | G06F 21/6209 380/277 |

(Continued)

OTHER PUBLICATIONS

Weber, Ralph O. "Information technology-ATA/ATAPI command set-3 (ACS-3)." Working Draft Project American National Standard, T13/2161-D, Oct. 28, 2013; 577 pages.

*Primary Examiner* — Eleni A Shiferaw
*Assistant Examiner* — Bassam A Noaman
(74) *Attorney, Agent, or Firm* — Baker Botts L.L.P.

(57) ABSTRACT

An information handling system (IHS) may implement techniques to detect a power-on event, to determine whether an authorized cryptographic erase operation of a storage device that implements cryptographic erasure is pending and, during an initialization sequence, to send to the device in response to determining that no such operation is pending, a command to disable cryptographic erasure on the device. The command may set an indicator on the device that, when set, disables cryptographic erasure. In response to determining that an authorized cryptographic erase operation is pending, the IHS may refrain from sending the command to disable cryptographic erasure on the device, and may send a command to cause the pending operation to be performed. In response to receiving an indication of completion of the pending operation, the IHS may clear an indicator that an authorized cryptographic erase operation is pending and initiate a power-on or reboot event.

20 Claims, 7 Drawing Sheets

(56) References Cited

U.S. PATENT DOCUMENTS

| | | | |
|---|---|---|---|
| 2015/0002900 A1* | 1/2015 | Cochran | G06K 15/1828 358/1.16 |
| 2015/0154121 A1* | 6/2015 | Schmier | G06F 12/1408 713/193 |
| 2015/0278088 A1* | 10/2015 | Ito | G06F 3/0608 711/103 |
| 2018/0285562 A1* | 10/2018 | Radhakrishnan | G06F 21/554 |

* cited by examiner

PREVENTING MALICIOUS CRYPTOGRAPHIC ERASURE OF STORAGE DEVICES

BACKGROUND

Field of the Disclosure

This disclosure relates generally to information handling systems and, more particularly, to preventing malicious cryptographic erasure of storage devices.

Description of the Related Art

As the value and use of information continues to increase, individuals and businesses seek additional ways to process and store information. One option available to users is information handling systems. An information handling system generally processes, compiles, stores, and communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some data storage devices, such as hard disk drives (HDDs) and solid state storage devices (SSDs), support data destructive commands for data management purposes. For example, some storage devices include mechanisms for performing block erase operations. Other storage devices include mechanisms for performing cryptographic erase operations. In some cases, standard and proprietary mechanisms of sending pass-through commands to storage devices are available. For example, under certain device protocols, and when operating within certain operating system environments, it is possible to issue an "open device" type command to the operating system, in response to which the operating system opens up a path to communicate directly to the device. Subsequently, commands that are understood by the device can be issued using a pass-through mechanism.

SUMMARY

In one aspect, a disclosed information handling system includes an interface to couple the information handling system to a storage device configured to implement cryptographic erasure, and circuitry to detect a power-on event, and to perform, in response to detection of the power-on event, a power-on initialization sequence. The circuitry to perform the power-on initialization sequence may include circuitry to determine whether an authorized cryptographic erase operation directed to the storage device and requested prior to detection of the power-on event is pending, and to send, to the storage device over the interface in response to a determination that no authorized cryptographic erase operation is pending, a command to disable cryptographic erasure of the storage device.

In any of the disclosed embodiments, the information handling system may further include circuitry to refrain from sending the command to disable cryptographic erasure of the storage device in response to a determination that an authorized cryptographic erase operation is pending.

In any of the disclosed embodiments, the information handling system may further include circuitry to send, from a trusted system entity to the storage device in response to the determination that an authorized cryptographic erase operation is pending, a command to cause the storage device to perform the pending cryptographic erase operation.

In any of the disclosed embodiments, the information handling system may further include circuitry to receive an indication that the pending cryptographic erase operation has completed, to clear an indicator that an authorized cryptographic erase operation is pending in response to receipt of the indication that the pending cryptographic erase operation has completed, and to initiate a power-on event or a reboot event.

In any of the disclosed embodiments, the information handing system may further include circuitry to receive a request to perform a cryptographic erase operation, to determine whether the request was received from an authenticated entity, to set an indicator that an authorized cryptographic erase operation is pending in response to a determination that the request was received from an authenticated entity, and to refrain from setting the indicator that an authorized cryptographic erase operation is pending in response to a failure to authenticate the entity from which the request was received. The circuitry to determine whether an authorized cryptographic erase operation directed to the storage device and requested prior to detection of the power-on event is pending may include circuitry to determine whether the indicator that an authorized cryptographic erase operation is pending is set.

In any of the disclosed embodiments, the storage device may be one of a plurality of storage devices coupled to the information handling system, and the request may include a request to perform a cryptographic erase operation on two or more of the storage devices.

In any of the disclosed embodiments, the command to disable cryptographic erasure of the storage device may be a command to set an indicator on the storage device. When set, the indicator on the storage device may cause cryptographic erasure of the storage device to be disabled. The indicator on the storage device may be settable only once subsequent to each power-on event or reboot event.

In any of the disclosed embodiments, the command to disable cryptographic erasure of the storage device may be issued to the storage device by a trusted system entity.

In another aspect, a disclosed method is for preventing malicious cryptographic erasure of storage devices in an information handling system. The method may include detecting a power-on event, and performing, in response to detecting the power-on event, a power-on initialization sequence. Performing the power-on initialization sequence may include determining whether a cryptographic erase operation directed to a storage device and authorized prior to detecting the power-on event is pending, and sending, to the storage device in response to determining that no authorized cryptographic erase operation is pending, a command to disable cryptographic erasure of the storage device.

In any of the disclosed embodiments, the method may further include detecting another power-on event, determining that a cryptographic erase operation directed to the storage device and authorized prior to detecting the other power-on event is pending, and refraining from sending a command to disable cryptographic erasure of the storage device. in response to determining that an authorized cryptographic erase operation is pending.

In any of the disclosed embodiments, the method may further include sending, from a trusted system entity to the storage device in response to determining that an authorized cryptographic erase operation is pending, a command to cause the storage device to perform the pending cryptographic erase operation.

In any of the disclosed embodiments, the method may further include receiving an indication that the pending cryptographic erase operation has completed, clearing an indicator that an authorized cryptographic erase operation is pending in response to receiving the indication that the pending cryptographic erase operation has completed, and initiating a power-on event or a reboot event.

In any of the disclosed embodiments, the method may further include, prior to detecting the power-on event, receiving a request to perform a cryptographic erase operation, determining whether the request was received from an authenticated entity, and setting an indicator that an authorized cryptographic erase operation is pending in response to authenticating the entity from which the request was received. Determining whether an authorized cryptographic erase operation directed to the storage device and requested prior to detection of the power-on event is pending may include determining whether the indicator that an authorized cryptographic erase operation is pending is set.

In any of the disclosed embodiments, the storage device may be one of a plurality of storage devices in the information handling system, and the request may include a request to perform a cryptographic erase operation on two or more of the storage devices.

In any of the disclosed embodiments, the method may further include, prior to detecting the power-on event, receiving a request to perform a cryptographic erase operation, determining whether the request was received from an authenticated entity, and refraining from setting an indicator that an authorized cryptographic erase operation is pending in response to a failure to authenticate the entity from which the request was received. Determining whether an authorized cryptographic erase operation directed to the storage device and requested prior to detection of the power-on event is pending may include determining whether the indicator that an authorized cryptographic erase operation is pending is set.

In any of the disclosed embodiments, the command to disable cryptographic erasure of the storage device may be a command to set an indicator on the storage device. When set, the indicator on the storage device may cause cryptographic erasure of the storage device to be disabled. The indicator on the storage device may be settable only once subsequent to each power-on event or reboot event.

In any of the disclosed embodiments, the command to disable cryptographic erasure of the storage device may be issued to the storage device by a trusted system entity.

A further disclosed aspect includes a system including a storage device configured to implement cryptographic erasure, one or more processors, and at least one non-transitory computer-readable storage medium storing program instructions. When executed by the one or more processors, the program instructions may cause the processors to perform determining that a power-on event has occurred and performing, in response to a determination that the power-on event has occurred, a power-on initialization sequence. Performing the power-on initialization sequence may include determining whether an authorized cryptographic erase operation directed to the storage device and requested prior to detection of the power-on event is pending, and sending, to the storage device in response to a determination that no authorized cryptographic erase operation is pending, a command to disable cryptographic erasure of the storage device.

In any of the disclosed embodiments, when executed by the one or more processors, the program instructions may cause the one or more processors to perform refraining from sending the command to disable cryptographic erasure of the storage device in response to a determination that an authorized cryptographic erase operation is pending.

In any of the disclosed embodiments, when executed by the one or more processors, the program instructions may cause the one or more processors to perform receiving a request to perform a cryptographic erase operation, determining whether the request was received from an authenticated entity, setting an indicator that an authorized cryptographic erase operation is pending in response to a determination that the request was received from an authenticated entity, and refraining from setting the indicator that an authorized cryptographic erase operation is pending in response to a failure to authenticate the entity from which the request was received. Determining whether an authorized cryptographic erase operation directed to the storage device and requested prior to detection of the power-on event is pending may include determining whether the indicator that an authorized cryptographic erase operation is pending is set.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
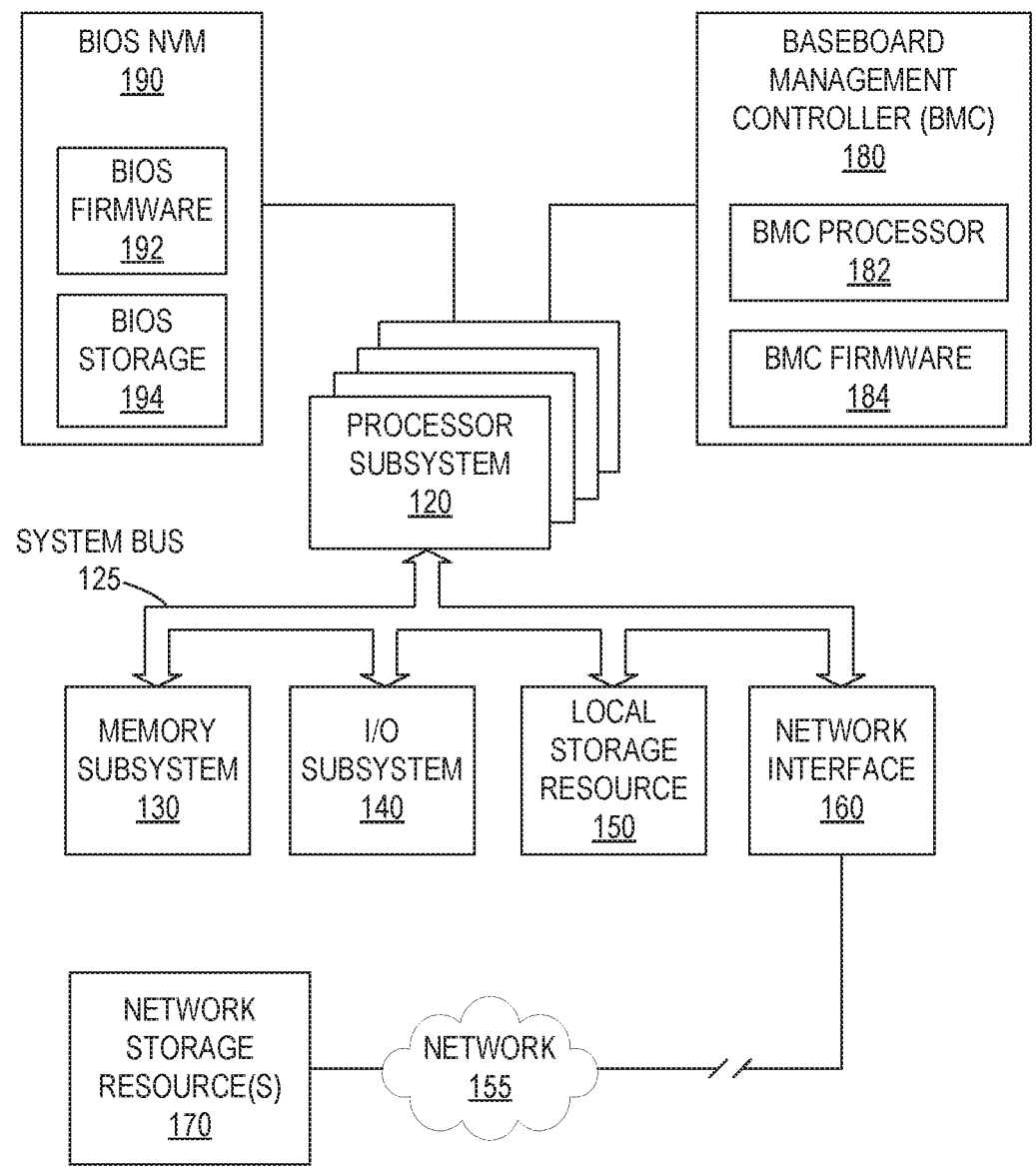
FIG. 1 is a block diagram illustrating selected elements of an embodiment of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72".

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), or flash memory (SSD); as well as communications media such as wires, optical fibers, microwaves, radio waves, and other electromagnetic or optical carriers; or any combination of the foregoing.

As will be described in further detail, the inventors of the present disclosure have developed systems and methods disclosed herein for preventing malicious cryptographic erasure of storage devices included in, or coupled to, information handling systems. In at least some embodiments, such a system may include circuitry to detect a power-on event, and to determine, during a power-on sequence, whether an authorized cryptographic erase operation directed to a storage device is pending. If not, the system may send a command to the storage device to disable cryptographic erasure on the device. However, if an authorized cryptographic erase operation is pending, the information handling system may refrain from sending the command to disable cryptographic erasure on the storage device. The system may instead send a command to the storage device to cause the pending cryptographic erase operation to be performed. In response to receiving an indication of completion of the cryptographic erase operation, the system may clear an indicator that an authorized cryptographic erase operation is pending and initiate a power-on or reboot event.

Particular embodiments are best understood by reference to FIGS. 1-7, in which like numbers are used to indicate like and corresponding parts.

Turning now to the drawings, FIG. 1 illustrates a block diagram depicting selected elements of an embodiment of information handling system 100. It is noted that FIG. 1 is not drawn to scale but is a schematic illustration. As described herein, information handling system 100 may represent a personal computing device, such as a personal computer system, a desktop computer, a laptop computer, a notebook computer, etc., operated by a user. In various embodiments, information handling system 100 may be operated by the user using a keyboard and a mouse (not shown).

As shown in FIG. 1, components of information handling system 100 may include, but are not limited to, a processor subsystem 120, which may comprise one or more processors, and system bus 125 that communicatively couples various system components to processor subsystem 120 including, for example, a memory subsystem 130, an I/O subsystem 140, local storage resource 150, and a network interface 160. System bus 125 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 may be a suitable system, apparatus, or device operable to serve as an interface between information handling system 100 and network 155. Network interface 160 may enable information handling system 100 to communicate over network 155 using a suitable transmission protocol or standard, including, but not limited to, transmission protocols or standards enumerated below with respect to the discussion of network 155. In some embodiments, network interface 160 may be communicatively coupled via network 155 to a network storage resource 170. The network 155 coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and messages (generally referred to as data). The network 155 coupled to network interface 160 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. The network 155 coupled to network interface 160 or various components associated therewith may be implemented using hardware, software, or any combination thereof.

As depicted in FIG. 1, processor subsystem 120 may comprise a system, device, or apparatus operable to interpret and/or execute program instructions and process data, and may include a microprocessor, microcontroller, digital signal processor (DSP), application specific integrated circuit (ASIC), or another digital or analog circuitry configured to interpret and execute program instructions and process data. In some embodiments, processor subsystem 120 may interpret and execute program instructions and process data stored locally (e.g., in memory subsystem 130 or local storage resource 150). In the same or alternative embodiments, processor subsystem 120 may interpret and execute program instructions and process data stored remotely (e.g., in network storage resources 170).

In some embodiments, a memory subsystem within processor subsystem 120 may include multiple data caches, such as one or more level 1 (L1) caches and/or level 2 (L2) caches (not shown). For example, a level 1 cache may be local to a particular processor or processor core within processor subsystem 120, and a level 2 cache may be shared between multiple processors or processor cores within a processor subsystem 120. In some embodiments of the present disclosure, one or more of these caches may be implemented as write-back caches. In such embodiments, the modified contents of the write-back caches may be written out to persistent memory (e.g., a non-volatile memory within memory subsystem 130 or local storage resource 150) in response to a power loss event. A cache controller within a memory subsystem of processor subsystem 120 may include circuitry to manage the contents of one or more L1 caches and/or L2 caches. For example, a cache controller may include circuitry to determine when and if an individual cache line or a group of cache lines should be flushed to persistent memory (such as a solid-state storage device within local storage resource 150 or network storage resource 170) or otherwise evicted from one of the caches in accordance with a predetermined cache line replacement policy.

Also in FIG. 1, memory subsystem 130 may comprise a system, device, or apparatus operable to retain and retrieve program instructions and data for a period of time (e.g., computer-readable media). Memory subsystem 130 may comprise random access memory (RAM), electrically erasable programmable read-only memory (EEPROM), a PCM-CIA card, flash memory, magnetic storage, opto-magnetic storage, or a suitable selection or array of volatile or non-volatile memory that retains data after power is removed. In some embodiments, memory subsystem 130 may include a level 3 (L3) cache or a last-level cache (not shown), which may be shared between processors or processor cores in multiple processor subsystems 120. Local storage resource 150 may comprise computer-readable media (e.g., hard disk drive, floppy disk drive, CD-ROM, and/or other type of rotating storage media, flash memory, EEPROM, or another type of solid state storage media) and may be generally operable to store instructions and data, and to permit access to stored instructions and data on demand. In at least some embodiments, local storage resource 150 or network storage resources 170 may include a collection or array of storage devices and a storage controller. In some embodiments, information handling system 100 may have a redundant array of independent disks (RAID) installed thereon. For example, local storage resource 150 or network storage resource 170 may include a RAID system, such as RAID system 200 illustrated in FIG. 2 and described below. This data storage virtualization technology may be used to present multiple physical disk drive components to information handling system 100 as if they were a single logical unit. In other embodiments, a host bus adapter (HBA) may couple information handling system 100, which acts as a host system, to local storage resource 150 or to network storage resource(s) 170 (not shown).

Also shown in FIG. 1 is non-volatile BIOS memory (BIOS NVM) 190, often simply or collectively referred to as the 'BIOS'. In some embodiments, BIOS NVM memory 190 may be implemented using non-volatile random access memory. As shown, BIOS NVM 190 may include BIOS firmware 192, representing pre-boot instructions executable by processor subsystem 120, for example, for preparing information handling system 100 to boot by activating various hardware components in preparation of launching an operating system for execution. BIOS firmware 192, which may implement the Basic Input/Output System (BIOS) firmware interface, may further include instructions for displaying a user interface (which may also referred to as a BIOS setup program) by which a user may access, modify, and store BIOS user settings. Also shown stored in BIOS NVM 190 is BIOS storage 194, which may represent data, such as program code, settings, data values, etc. that BIOS firmware 192 may store. In certain embodiments, BIOS firmware 192 may have access to network interface 160 for various types of communication, such as with a network administrator. In certain embodiments, at least a portion of BIOS storage 194 may physically reside on a remote storage resource, such as in network storage resource 170. In some embodiments, an interface in compliance with the Unified Extensible Firmware Interface (UEFI) specification may replace the Basic Input/Output System (BIOS) firmware interface in the example embodiment illustrated in FIG. 1. The UEFI specification defines a software interface between an operating system and platform firmware.

In information handling system 100, I/O subsystem 140 may comprise a system, device, or apparatus generally operable to receive and transmit data to or from or within information handling system 100. I/O subsystem 140 may represent, for example, a variety of communication interfaces, graphics interfaces, video interfaces, user input interfaces, and peripheral interfaces. In some embodiments, I/O subsystem 140 may comprise a touch panel and a display adapter (not shown). The touch panel may include circuitry for enabling touch functionality in conjunction with a display device that is driven by the display adapter.

In the illustrated embodiment, information handling system 100 also includes a baseboard management controller (BMC) 180. Baseboard management controller 180 includes a BMC processor 182 and BMC firmware 184 that when executed by BMC processor 182 performs the operations of the baseboard management controllers described herein. In at least some embodiments, baseboard management controller 180 may monitor the physical state of information handling system 100 as well as devices included within or coupled to information handling system 100. In some embodiments, baseboard management controller 180 may be configured to perform remote management operations. In some embodiments, baseboard management controller 180 may be configured to provide automatic alerts, to initiate power-on or power cycle events, boot or reboot events, or other power control functions on behalf of information handling system 100.

In at least some embodiments, information handing system 100 may also include one or more power control modules and one or more power supply units (not shown). In some embodiments, baseboard management controller 180 may be implemented within one or more of the power control modules.

Figure 2:
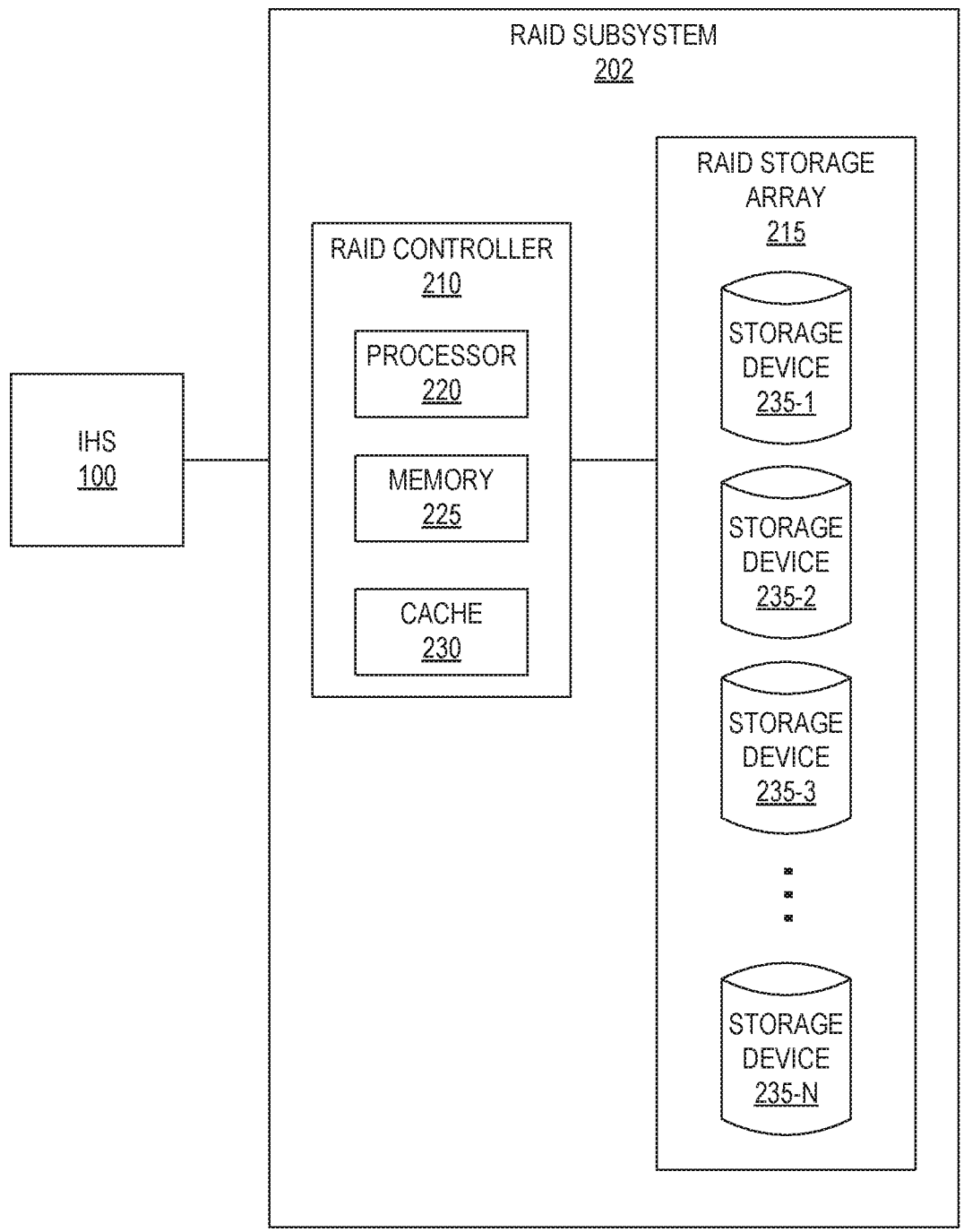
FIG. 2 a block diagram illustrating selected elements of an embodiment of a RAID system.

Referring now to FIG. 2, selected elements of an embodiment of a RAID system 200 are shown. RAID system 200 includes information handling system 100 (see FIG. 1) communicatively coupled to a RAID subsystem 202. It is noted that FIG. 2 is not drawn to scale but is a schematic illustration. In the example embodiment illustrated in FIG. 2, RAID subsystem 202 includes a RAID controller 210 and a RAID storage array 215. RAID controller 210 includes a processor 220, main memory 225, and cache memory 230. RAID controller 210 is connected to a RAID storage array 215 that includes a plurality of storage devices 235, shown as storage device 235-1, 235-2, 235-3, and so on, up to 235-N, where N is any suitable number of storage devices. In various embodiments, RAID subsystem 202 may be included within local storage resource 150 or network storage resource 170 described with respect to FIG. 1.

In RAID system 200, memory 225 may store firmware or other executable instructions for processor 220. Memory 225 may be similar to memory subsystem 130 described in FIG. 1. Cache memory 230 may be used to buffer I/O transfers during operation of RAID subsystem 202, such as when accessing RAID storage array 215. In various embodiments, RAID storage array 215 may be homogenous or inhomogeneous with respect to types of devices used for storage device 235. In various embodiments, RAID storage array 215 may include storage devices 235 with Small Computer System Interface (SCSI) interfaces, Serial Attached SCSI (SAS) interfaces, Serial Advanced Technology Attachment (SATA) interfaces, or may include storage devices or drives having other interfaces. RAID storage array 215 may include storage devices 235 having different capacities, seek times, and transfer rates. Storage devices 235 may include magnetic hard drives, flash memory, solid state memory, storage devices based on other technologies, or various combinations thereof. Although a single instance of RAID storage array 215 is shown in FIG. 2 for descriptive clarity, it will be understood that, in different embodiments, RAID subsystem 202 or RAID controller 210 may be used with different numbers or instances of RAID storage array 215, each of which may include different numbers of storage devices 235.

Some storage devices implement a particular set of data destructive commands called the SANITIZE DEVICE command set or the SANITIZE feature set. These storage devices support a sanitize cryptographic erase operation in which, when a particular one of these commands is issued, the storage device receiving the command performs an operation to change the key with which data is encrypted on the storage device. Once the operation to change the key is performed, all data that was previously encrypted and stored on the storage device is rendered indeterminate, and is thus useless. The particular sanitize cryptographic erase command implemented on a given storage device may be dependent on the device type and on the particular implementation of the SANITIZE DEVICE feature set command set on the given storage device. For example, for SATA devices, the sanitize cryptographic erase command may be of the form "SANITIZE, with CRYPTO SCRAMBLE EXT", while for SAS devices, the sanitize cryptographic erase command may be of the form "SANITIZE, Cryptographic Erase". For Non-Volatile Memory Express (NVMe) devices, the sanitize cryptographic erase command may be implemented using a "Format Unit" command. NVMe is a communications interface and protocol developed specifically for SSDs. In some existing systems, these and other sanitize cryptographic erase commands may be exploited by a malicious software agent that runs in the operating system environment with the intention of rendering critical data unusable. In some existing systems, such a malicious agent may utilize a pass-through mechanism to send a sanitize cryptographic erase command to a storage device, rendering the data stored on the storage device useless.

In at least some embodiments of the present disclosure, these types of malicious cryptographic erase operations may be prevented using protection mechanisms implemented on the system side in conjunction with protection mechanisms implemented on the storage devices themselves. For example, in at least some embodiments of the present disclosure, the storage devices may support a one-time settable (per power-on or boot event) indicator which, when set, disables the cryptographic erase capability within the SANITIZE DEVICE feature set. More specifically, when this indicator is set on a storage device, the storage device will not accept cryptographic erase commands from the host system, nor will the storage device perform cryptographic erase operations. As described in more detail below, the storage device may include a state machine to control the ability to accept cryptographic erase commands and to perform cryptographic erase operations. In response to receiving a command to disable cryptographic erasure, the storage device may transition from a state in which cryptographic erase commands are accepted to a state in which the storage device will not accept these commands. In at least some embodiments, the storage device may latch this condition and may not allow cryptographic erase operations to be performed until after a power-on or reboot event takes place. In at least some embodiments, if and when an authorized cryptographic erase operation is performed while the storage device is in a state in which cryptographic erase commands are accepted, the storage device may transition to a state in which no further cryptographic erase commands are accepted or performed.

In some embodiments, the indicator which, when set, disables the cryptographic erasure capability of a storage device may be implemented as a bit in a control mode page for a storage device or at a log address for the storage device. For example, a control mode page for a SAS device may hold meta data about the device which can, under certain circumstances, be changed by the user. In some embodiments, this meta data may include including an indicator of whether or not cryptographic erasure is disabled on the storage device. In another example, a SATA device may maintain a number of different logs in which various device performance information, error information, or other information, including an indicator of whether or not cryptographic erasure is disabled, may be stored. In other embodiments, a command to disable cryptographic erase operations SATA devices, including some NVMe devices, may be implemented using a SET FEATURES command. For example, the SET FEATURES command is a 28-bit, non-data command for SATA devices that specifies a specific feature to be set within the command's FEATURE field, and specifies the level of the feature to be set in the command's COUNT field, if applicable. In some embodiments, this command may be used to disable cryptographic erasure capability on a storage device. In some embodiments of the present disclosure, the indicator which, when set, disables the cryptographic erasure capability of a storage device may be implemented as a non-persistent setting to enable easy migration of drives between different storage stacks. In at least some embodiments, a storage device that implements the protection techniques described herein, including the state machine described herein, may continue to function in legacy systems normally and may support the SANITIZE DEVICE feature set, thereby maintaining backwards compatibility. In such embodiments, however, the sanitize cryptographic erase operation can only be executed once following each power-on or boot/reboot event that affects the storage device.

In at least some embodiments, protection mechanisms implemented on the system side may take advantage of the storage device state machines described herein to prevent malicious cryptographic erasure of storage devices that include these state machines. The protection mechanisms implemented on the system side include actions taking during normal operation and actions taken during execution of a managed cryptographic erase request.

In at least some embodiments, during normal operation, the onus may be on various trusted system entities, such as the BIOS or UEFI firmware, the system BMC, or an HBA or RAID controller (as applicable) to disable SANITIZE cryptographic erase operations at the storage device level. This approach may prevent attacks from a malicious software agent that is able to issue pass-through commands to a storage device. In one example embodiment, when an information handling system that implements a server boots up, the system BIOS or UEFI firmware or the system BMC may, by default, disable the cryptographic erase capability of a storage device by issuing a command that causes the storage device to refrain from accepting and acting on any cryptographic erase commands that target the storage device. Subsequently, even if a malicious agent launches in the operating environment and gains access to a path through which it can issue cryptographic erase commands to the storage device, the storage device will not accept nor act on those commands.

In at least some embodiments, the systems described herein may, by default, disable cryptographic erase capability on a storage device. However, under certain circumstances, they may facilitate the performance of a cryptographic erase operation in response to an authorized cryptographic erase operation request. A user may have a legitimate reason for performing a cryptographic erase operation on one or more storage devices. For example, the user may want to wipe out data on a storage device, or make it useless, in order to repurpose the storage device or before disposing of the storage device. In another example, the user may ship equipment, including one or more storage devices, from one site to another and may be worried about the loss of confidential data in the case of theft. In order to support these and other valid use cases, the systems described herein may implement mechanisms to allow authorized cryptographic erase operations to be performed.

In some embodiments, when a user requests a cryptographic erase operation directed to a storage device, the only method by which the operation can be executed is by using one of the "trusted" system management tools in the pre-operating system (pre-OS) environment following an initial system power-on or boot event. These trusted system entities may include IDRAC (e.g., GUI or CLI or RACADM) and UEFI based tools. In this pre-OS environment, no operating-system based malicious software can be running.

As described in more detail herein, an information handling system may implement a method to enable cryptographic erase on a storage device that implements cryptographic erase capability under certain conditions (such as in response to a system provisioning boot event) and using specific customer facing interfaces. In some embodiments, this may involve allowing the cryptographic erasure of drives only while operating in the pre-OS environment and only if an indication that an authorized cryptographic erase operation was received prior to the most recent power-on or boot event and is pending is set. In some embodiments, this may involve allowing the cryptographic erasure of drives only via a sideband management interface (such as the system BMC). While running in the operating system environment, a trusted system entity that is connected to a storage device may disable cryptographic functionality on the storage device. In various embodiments, the trusted system entities that may connect an information handling system to one or more storage devices include HBA and RAID controllers that connect the system to SAS and SATA devices, system AHCI controllers that connect the system to SATA devices, and the system BMC, which connects the system to NVMe devices via a sideband connection.

Figure 3:
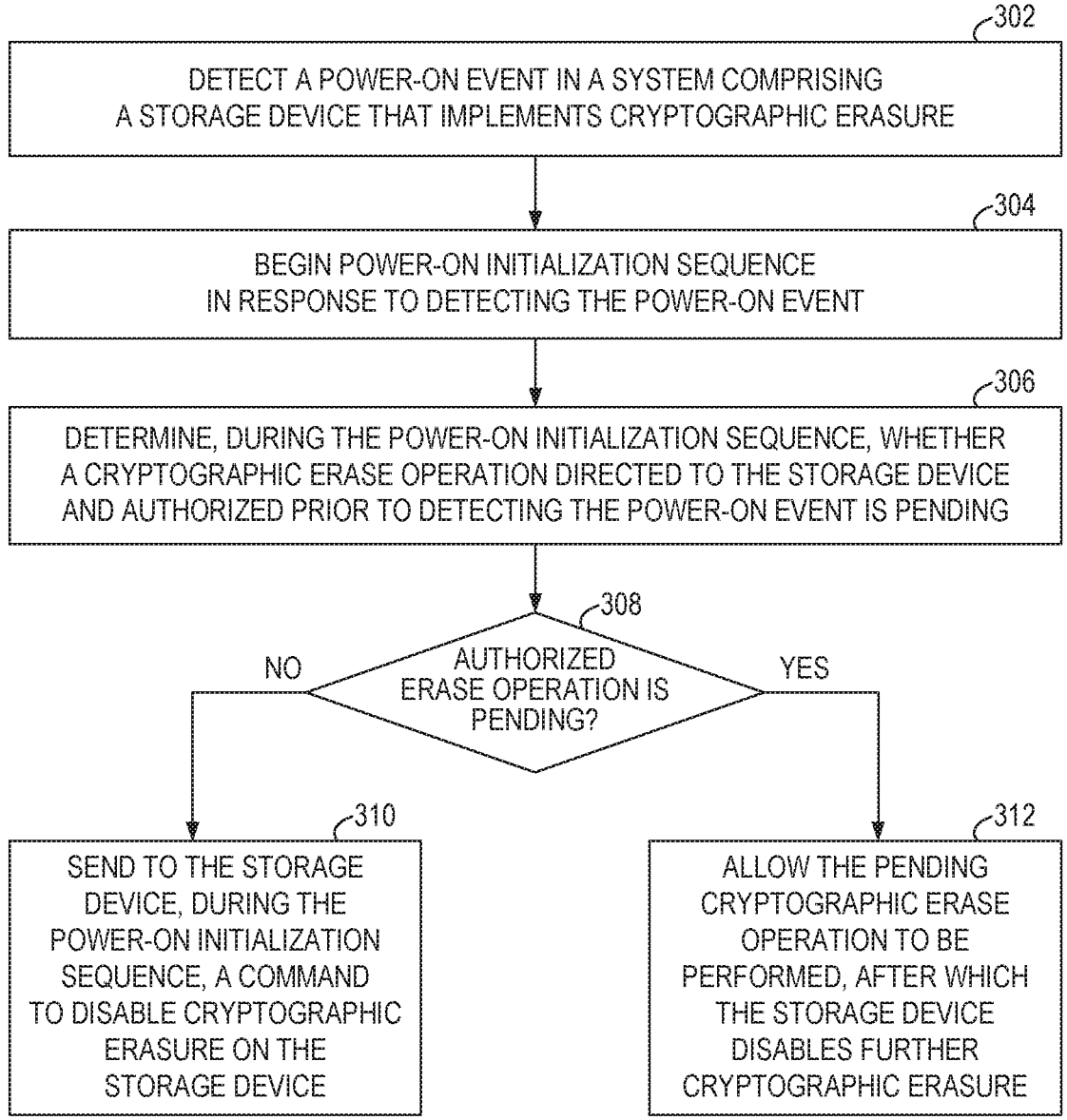
FIG. 3 is a flow diagram illustrating selected elements of an embodiment of a method for preventing malicious cryptographic erasure of storage devices.

Referring now to FIG. 3, selected elements of an embodiment of a method 300 for preventing malicious cryptographic erasure of storage devices as described herein, are depicted in flow diagram form. Method 300 may be performed using information handling system 100, in conjunction with a storage device configured to implement cryptographic erasure (see FIGS. 1 and 2). It is noted that certain operations described in method 300 may be optional or may be rearranged in different embodiments. Method 300 may begin, at step 302, by detecting a power-on event in a system comprising a storage device that implements cryptographic erasure. The power-on event may be an initial system power-on event, a system power cycle causing power to be removed from and then restored to the storage device, a system boot or reboot event, an initial power-on event for the storage device, a hot-plug event for the storage device, a power cycle event causing power to be removed from and then restored to the storage device, or another type of power-on event affecting the entire system or the storage device, in different embodiments. Method 300 may include, at 304, beginning a power-on initialization sequence in response to detecting the power-on event. The particular power-on initialization sequence that is performed may be dependent on the type of power-on event that was detected.

Method 300 may include determining, at 306, during the power-on initialization sequence, whether a cryptographic erase operation directed to the storage device and authorized prior to detecting the power-on event is pending. If, as shown by the negative exit from 308, no authorized cryptographic erase operation is pending, the method may include, at 310, sending to the storage device, during the power-on initialization sequence, a command to disable cryptographic erasure on the storage device. Otherwise, the method may include, at 312, allowing the pending cryptographic erase operation to be performed, after which the storage device may disable further cryptographic erasure on the storage device. For example, the storage device may allow at most one cryptographic erase operation to be performed subsequent to each power-on event affecting the storage device.

In some embodiments, the storage devices described herein may include state machines that control the ability to perform cryptographic erase operations. For example, in some embodiments, the storage devices may include a state machine that operates in accordance with the SANITIZE DEVICE feature set and may support a CRYPTOGRAPHIC SCRAMBLE type SANITIZE operation in which the internal encryption keys that are used for encrypting and decrypting user data are changed, rendering the user data stored on the devices indeterminate, and therefore useless. These and other operations that use cryptographic operations to render stored data indeterminate are referred to herein as cryptographic erase operations.

Figure 4:
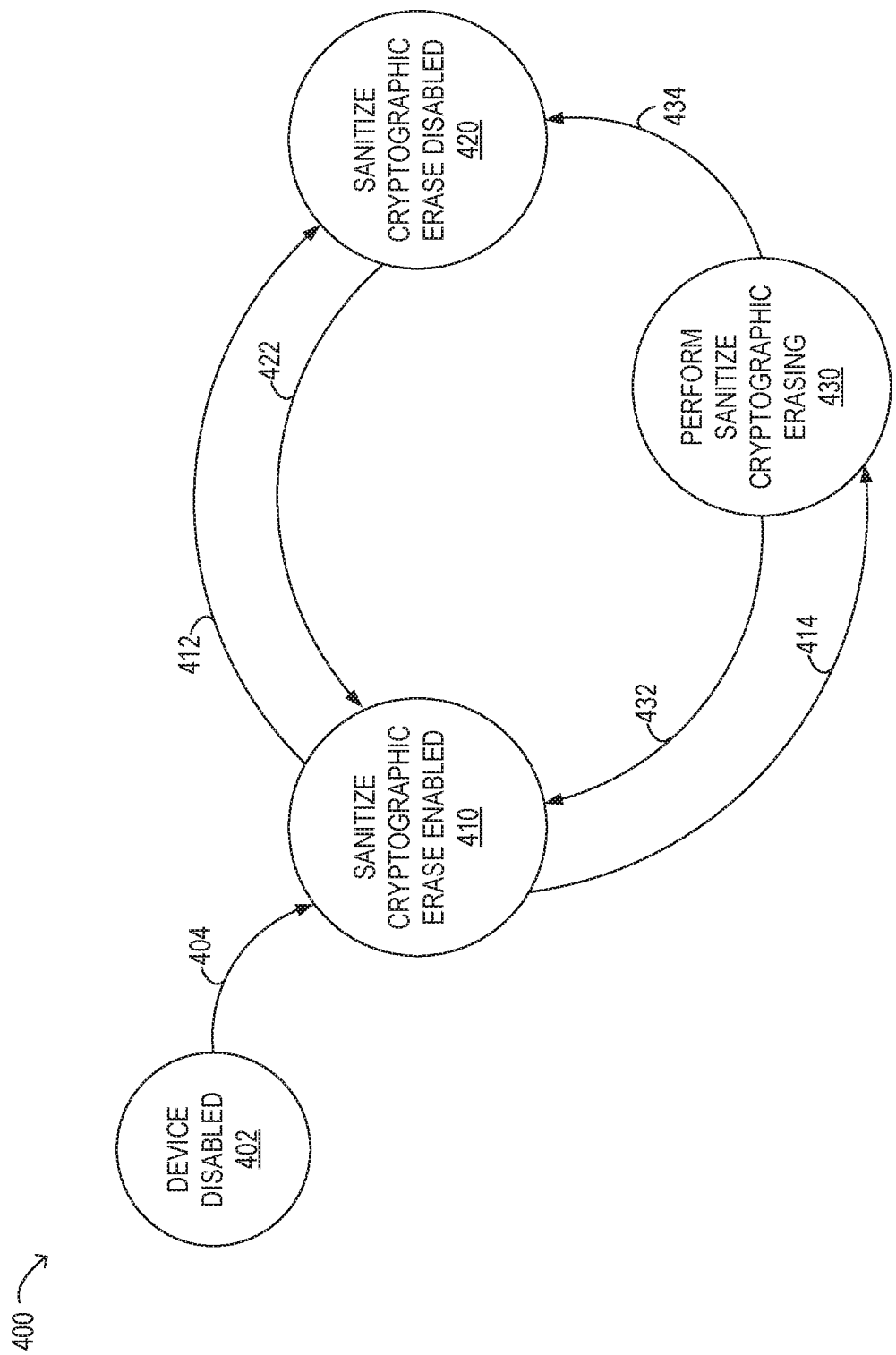
FIG. 4 is a state diagram illustrating selected elements of an embodiment of a state machine on a storage device that controls the ability to perform cryptographic erase operations on the storage device.

One embodiment of a state machine on a storage device that controls the ability to perform cryptographic erase operations on the storage device is illustrated by state diagram 400 in FIG. 4. More specifically, state diagram 400 illustrates various transitions between four storage device states: a device disabled state 402, a sanitize cryptographic erase enabled state 410, a sanitize cryptographic erase disabled state 420, and a perform sanitize cryptographic erasing state 430. In the example illustrated in FIG. 4, the storage device may initially be in state 402 ("device disabled"), e.g., before it has been powered up or before it has been installed in or coupled to an information handling system. In the example embodiment illustrated in FIG. 4, trigger condition 404 for causing a transition from state 402 ("device disabled") to state 410 ("sanitize cryptographic erase enabled") may include a system or device level power-on event or power cycle event, or a storage device hot-plug event. While the storage device is in state 410, sanitize cryptographic erase operations may be enabled on the storage device. This mechanism may ensure that the storage devices retain backward compatibility in terms of their behavior.

Trigger condition 412 for causing a transition from state 410 ("sanitize cryptographic erase enabled") to state 420 ("sanitize cryptographic erase disabled") may include receipt of a disable sanitize cryptographic erase command. The command may be issued by a trusted entity of an information handling system that includes, or is coupled to, the storage device. While in state 420, a sanitize cryptographic erase feature may be disabled on the storage device. In this state, if a request to perform a sanitize cryptographic erase operation is received, e.g., from a malicious agent, the operation will not be performed on the storage device. For example, while in state 420, the storage device may not accept any requests to perform a sanitize cryptographic erase operation. The storage device may deny the requests, returning an indication of failure, or may simply ignore them, in different embodiments.

Trigger condition 414 for causing a transition from state 410 ("sanitize cryptographic erase enabled") to state 430 ("perform sanitize cryptographic erasing") may include receipt of a command to perform a sanitize cryptographic erase command. The command may be issued by a trusted entity of an information handling system that includes, or is coupled to, the storage device following a determination by the system during a power-on sequence that an authorized sanitize cryptographic erase operation received prior to the most recent power-in event is pending. In response to entering state 430, the storage device may perform, or at least attempt to complete, the requested sanitize cryptographic erase command, after which it may send an indication of completion to the requestor. Note that, in at least some embodiments, the indication of completion may be sent to the requestor regardless of whether the operation completed successfully or the storage device failed to perform the requested operation in full or in part.

Trigger condition 434 for causing a transition from state 430 ("perform sanitize cryptographic erasing") to state 420 ("sanitize cryptographic erase disabled") may include completion of the sanitize cryptographic erase operation while in state 430. As noted above, the sanitize cryptographic erase operation may be considered completed regardless of whether the operation completed successfully or the storage device failed to perform the requested operation in full or in part.

Trigger condition 422 for causing a transition from state 420 ("sanitize cryptographic erase disabled") to state 410 ("sanitize cryptographic erase enabled") may include a system power cycle causing power to be removed from and then restored to the storage device, a system reboot event, a hot-plug event for the storage device, a power cycle event causing power to be removed from and then restored to the storage device, or another type of power-on event affecting the storage device, in different embodiments.

Trigger condition 432 for causing a transition from state 430 ("perform sanitize cryptographic erasing") to state 410 ("sanitize cryptographic erase enabled") may include a system power cycle causing power to be removed from and then restored to the storage device, a system reboot event, a hot-plug event for the storage device, a power cycle event causing power to be removed from and then restored to the storage device, or another type of power-on event affecting the storage device, in different embodiments.

In other embodiments, more, fewer, or different conditions may trigger transitions between states 402, 410, 420, and 430.

In some embodiments, the mechanisms applied in preventing malicious cryptographic erasure of storage devices may be different at different points in time, depending on the state of the system as a whole. For example, the actions taken during a power-on sequence in a pre-OS environment may include actions taken by software components that do not run on the operating system, such as the system BIOS or UEFI firmware, the system BMC, and the HBA or RAID controller. These actions may cause a state machine on the storage device, such as state machine 400 illustrated in FIG. 4, to transition between states to disable sanitize cryptographic erase operations during a power-on sequence in a server or a storage solution.

Figure 5:
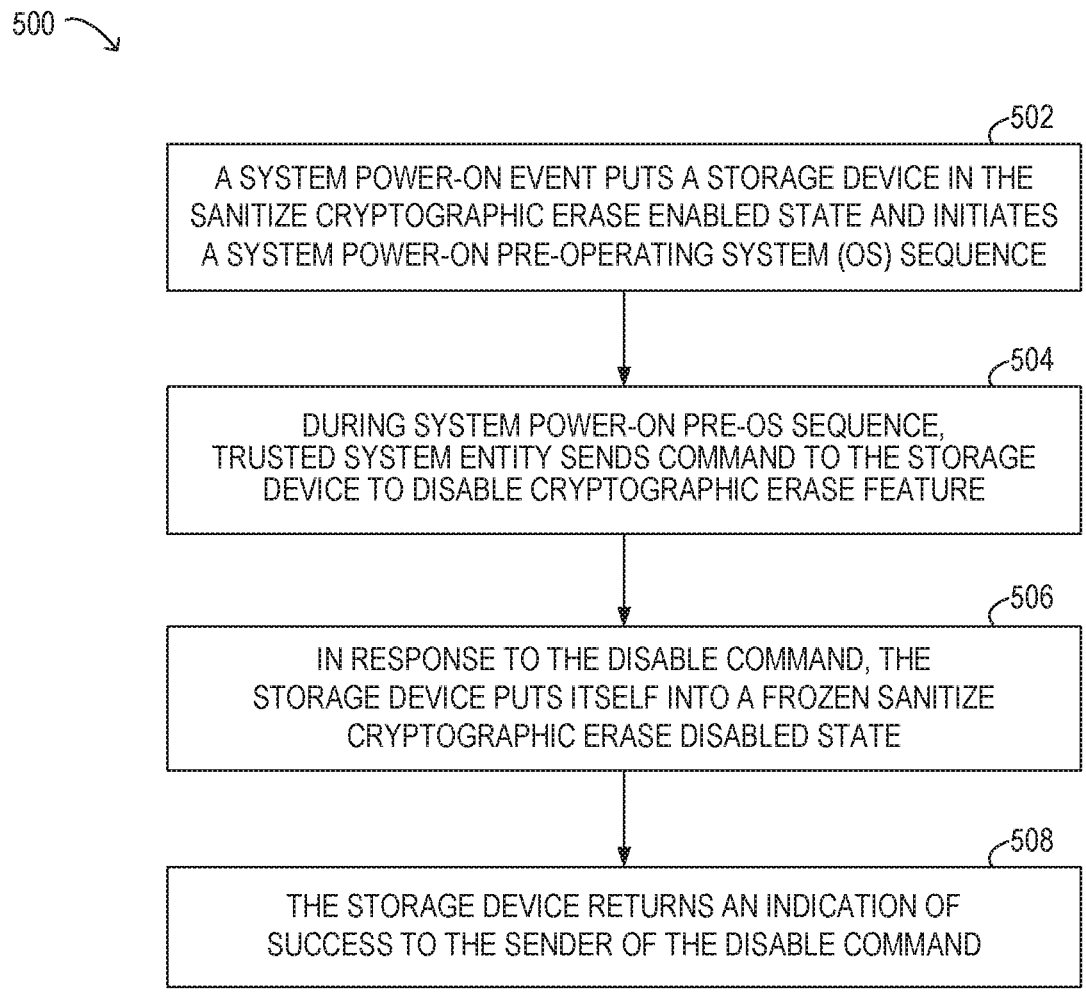
FIG. 5 is a flow diagram illustrating selected elements of an embodiment of a method for initializing the state of a storage device during performance of a pre-operating system power-on sequence.

Referring now to FIG. 5, selected elements of an embodiment of method 500 for initializing the state of a storage device during performance of a pre-operating system power-on sequence, as described herein, are depicted in flow diagram form. Method 500 may be performed using information handling system 100, in conjunction with a storage device configured to implement cryptographic erasure (see FIGS. 1 and 2). It is noted that certain operations described in method 500 may be optional or may be rearranged in different embodiments.

Method 500 may begin, at 502, with a system power-on event putting a storage device into the sanitize cryptographic erase enabled state and initiating a system power-on pre-operating system (pre-OS) sequence. The system power-on event may be an initial system power-on event, a system boot event, or another type of power-on event affecting the entire system, including the storage device, in different embodiments. Method 500 may include, at 504, during the system power-on pre-OS sequence, a trusted system entity sending a command to the storage device to disable a cryptographic erase feature implemented on the storage device. In various embodiments, the trusted system entity that issues the command to the storage device to disable cryptographic erase operations may be the BIOS or UEFI firmware, an HBA or RAID controller, or the system BMC. In other embodiments, other trusted system entities may issue a command to the storage device to disable cryptographic erase operations. In some embodiments, following the disabling of disable cryptographic erase operations, the storage device may return an indication of success to the requestor. In certain embodiments, the command to disable cryptographic erase operations may be a command to set an indicator on the storage device that, when set, causes cryptographic erasure of the storage device to be disabled. In one example, the indicator may be implemented as a bit in a control mode page of a SAS device or at a log address for the storage device. In another example, the command to disable cryptographic erase operations may be implemented using a Set Features command of SATA devices, including some NVMe devices. The indicator on the storage device may be settable only once subsequent to each power-on event or reboot event affecting the storage device.

At 506, in response to the issuance of the disable command, method 500 may include the storage device putting itself into a frozen sanitize cryptographic erase disabled state. At 508, the method may include the storage device returning an indication of success to the sender of the disable command, indicating to the sender that cryptographic erasure is disabled on the storage device.

As noted above, the mechanisms applied in preventing malicious cryptographic erasure of storage devices may be different at different points in time, depending on the state of the system as a whole. For example, unlike the actions taken during an initial pre-OS power-on sequence such as that illustrated in FIG. 5, the actions taken in an operating system environment may include actions taken by software components that run on the operating system. In embodiments that employ the techniques described herein for preventing malicious cryptographic erasure of storage devices, a malicious agent running in the operating system environment may attempt to perform a cryptographic erase operation, but it will not succeed.

Figure 6:
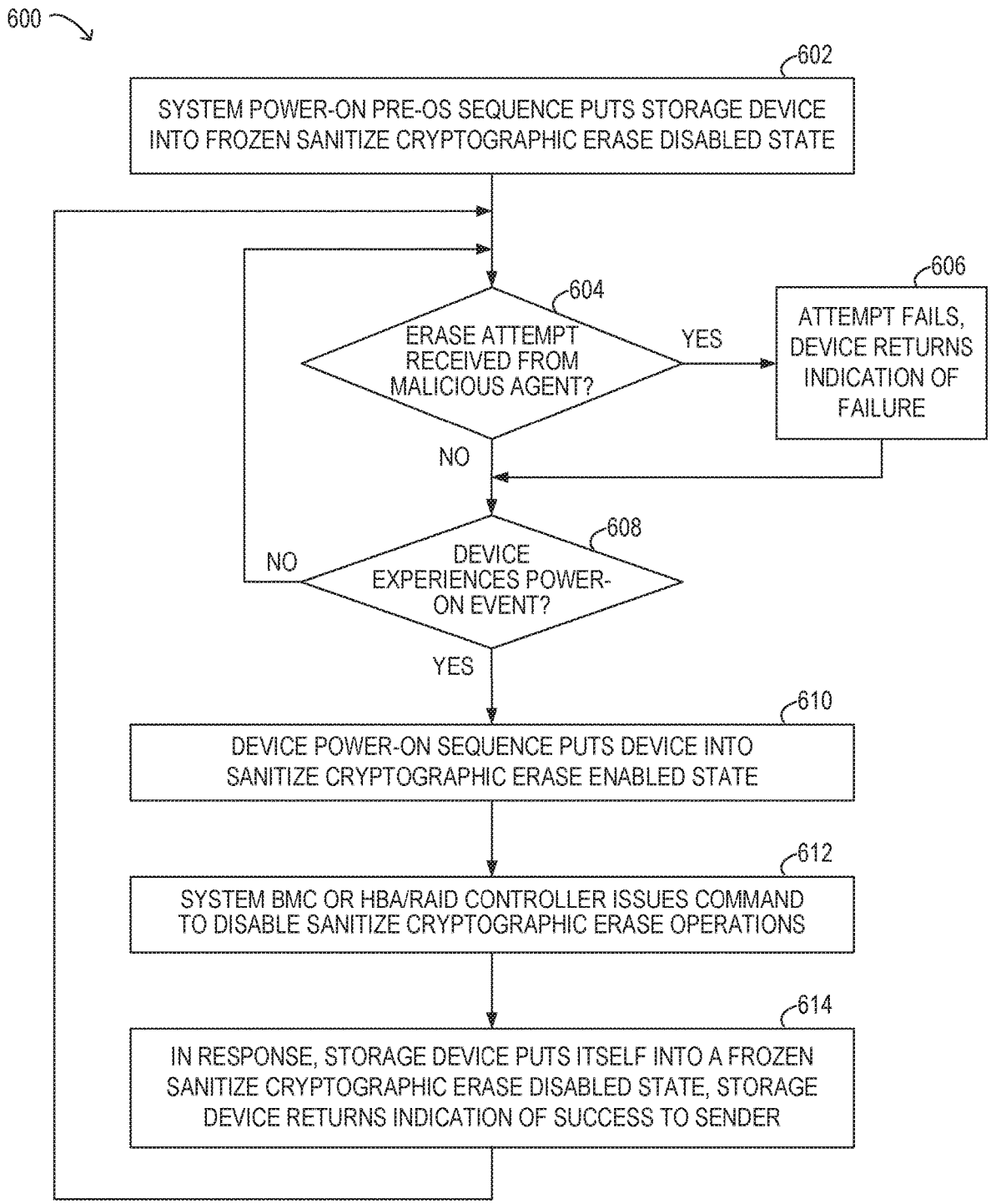
FIG. 6 is a flow diagram illustrating selected elements of an embodiment of a method for controlling the state of a storage device during performance of a power-on sequence in an operating system environment.

Referring now to FIG. 6, selected elements of an embodiment of a method 600 for controlling the state of a storage device during performance of a power-on sequence in an operating system environment, as described herein, are depicted in flow diagram form. Method 600 may be performed using information handling system 100, in conjunction with a storage device configured to implement cryptographic erasure (see FIGS. 1 and 2). It is noted that certain operations described in method 600 may be optional or may be rearranged in different embodiments.

Method 600 may begin, at 602, with a system power-on pre-OS sequence putting the storage device into frozen sanitize cryptographic erase disabled state. If at 604, an erase attempt is received from malicious agent, the attempt may fail, and the method may include the storage device returning an indication of failure, as in 606. In some embodiments, a storage device that implements sanitize cryptographic erase operations may include an indicator that, when set, causes cryptographic erasure of the storage device to be disabled, and this indicator may be settable only once subsequent to each power-on event or reboot event. In some such embodiments, the storage device may set the indicator following completion of a sanitize cryptographic erase operation attempt, regardless of whether or not the attempt is successful.

If, at 608, the storage device experiences power-on event, the method may include a device power-on sequence putting the storage device into sanitize cryptographic erase enabled state, as in 610. For example, the storage device may be put into the sanitize cryptographic erase enabled state in response to a hot-plug event for the storage device, a power-cycle event for the storage device, a system reboot event, or another power-on event that affects the storage device.

In the example embodiment illustrated in FIG. 6, method 600 may include, at 612, issuing, by a trusted system entity, a command to the storage device to disable sanitize cryptographic erase operations on the storage device. In various embodiments, the command may be issued by the system BMC or by an HBA or RAID controller. The command may be issued as part of a drive detection sequence, in some embodiments. In response to the command, method 600 may include, at 614, the storage device putting itself into a frozen sanitize cryptographic erase disabled state, after which the storage device may return an indication of success to the sender of the command.

As illustrated in FIG. 6, method 600 may subsequently include returning to 604, after which any or all of the operations illustrated in 604 to 614 may be repeated one or more times, as appropriate, to control when and whether a sanitize cryptographic erasure feature is enabled on the storage device.

In some information handling systems, there may be legitimate reasons for a user to initiate a sanitize cryptographic erase operation. In some embodiments of the present disclosure, a user may send a request for a sanitize cryptographic erase operation to a management application that is running in the operating system environment, may send a request for a sanitize cryptographic erase operation over the network, or may send a request for a sanitize cryptographic erase operation into the system BMC. In some cases, the request may be for a system wipe operation in which sanitize cryptographic erase operations are to be applied to multiple storage devices or to all of the storage devices in a collection of storage devices, such as in RAID storage array 215. However, in certain embodiments, sanitize cryptographic erase operations cannot be performed while the system is running. For example, in certain embodiments, these operations cannot be performed while the targeted storage device or devices are being using by the operating system, or are being accessed by a database, a web server, or another executing application. In at least some embodiments, in response to receiving a request for a sanitize cryptographic erase operation from an authenticated user, an indicator that an authorized cryptographic erase operation is pending may be set, but the pending sanitize cryptographic erase operation may not be performed while the system is running. Instead, the operation may be performed subsequent to the next power-on or reboot event that affects the system, including the storage device(s) to which the pending operation is directed. The next time a power-on or reboot event occurs, one of the trusted system entities may determine, based on the indicator, that an authorized cryptographic erase operation is pending, and may cause each of the targeted storage device(s) to perform a sanitize cryptographic erase operation.

Figure 7:
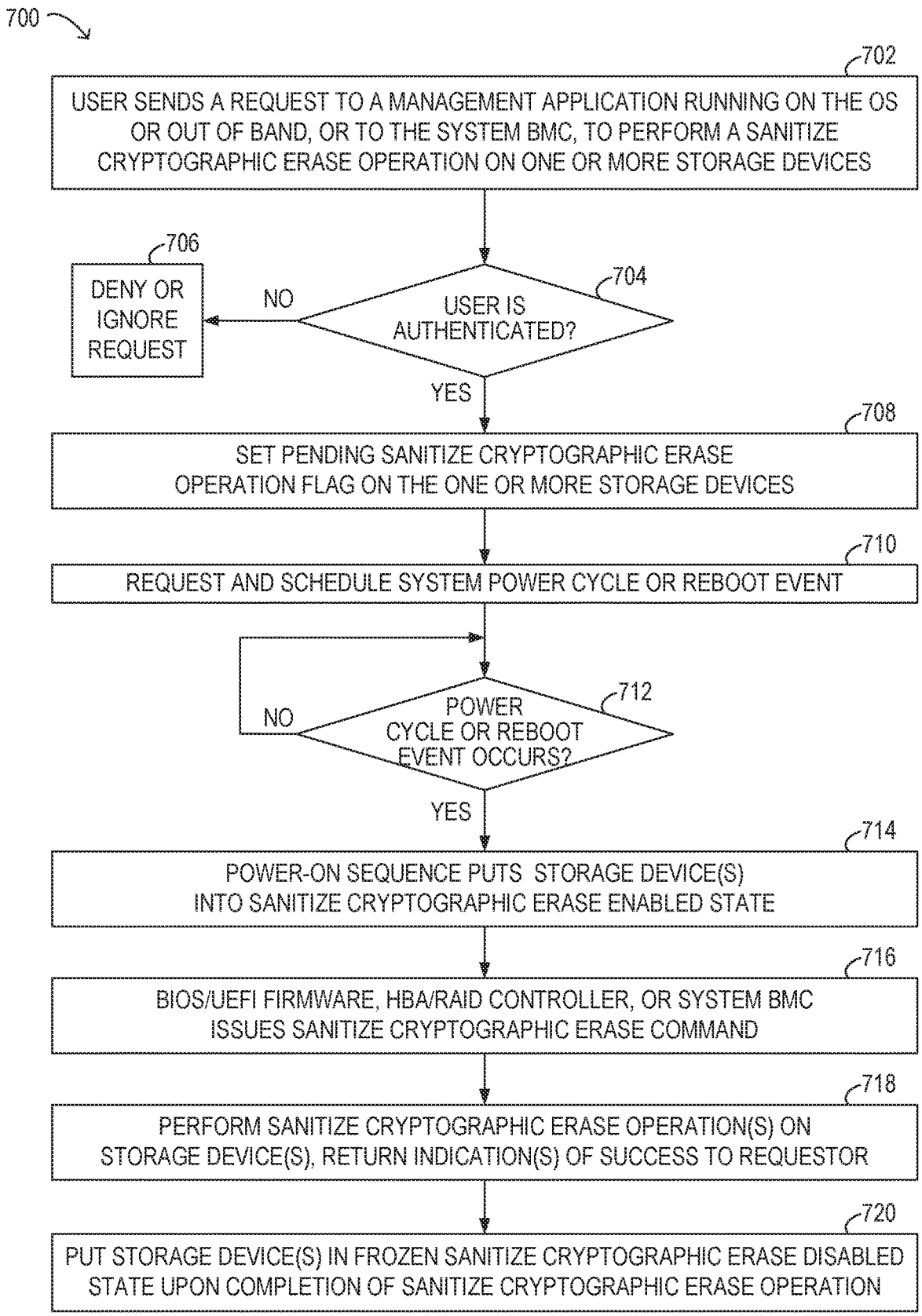
FIG. 7 is a flow diagram illustrating selected elements of an embodiment of a method for performing an authorized sanitize cryptographic erase operation.

Referring now to FIG. 7, selected elements of an embodiment of method 700 for performing an authorized sanitize cryptographic erase operation, as described herein, are depicted in flow diagram form. Method 700 may be performed using information handling system 100, in conjunction with a storage device configured to implement cryptographic erasure (see FIGS. 1 and 2). It is noted that certain operations described in method 700 may be optional or may be rearranged in different embodiments.

Method 700 may begin, at 702, with a user sending a request to a management application running on the operating system or out of band, or to the system BMC to perform a respective sanitize cryptographic erase operation on one or more storage devices. For example, a system may include, or be coupled to, multiple storage devices that implement cryptographic erase operations, and the request may include a command to perform a system wipe operation to make the data stored on some or all of these storage devices indeterminate.

Method 700 may include at 704, attempting to authenticate the user. If the user is successfully authenticated, the method may proceed to 708. Otherwise, the method may include denying or ignoring the request, as in 706. At 708, the method may include setting an indicator on each of the devices that an authorized cryptographic erase operation is pending. In some embodiments, the indicator may be a pending sanitize cryptographic erase operation flag. After setting the indicator(s) that an authorized cryptographic erase operation is pending, method 700 may include requesting and scheduling a system power cycle, as in 710. In some embodiments, setting the indicator(s) that an authorized cryptographic erase operation is pending may have no effect until after the next power cycle or reboot event.

If and when, at 712, a power cycle or reboot event occurs, the method may include performing a power-on sequence, putting the storage device(s) into a sanitize cryptographic erase enabled state, as in 714. The power-on sequence may performed in response to occurrence of the scheduled event or in response to another power cycle or reboot event that occurs subsequent to setting the indicator(s) that an authorized cryptographic erase operation is pending one or more storage devices. For example, in some embodiments, the power-on sequence may be performed in response to a system power cycle causing power to be removed from and then restored to the storage device, a system reboot event, a hot-plug event for the storage device, a power cycle event causing power to be removed from and then restored to the storage device, or another type of power-on event affecting the entire system, including the storage device, other than the requested system power cycle or reboot event.

In the example embodiment illustrated in FIG. 7, method 70 may include, at 716, a trusted system entity issuing a sanitize cryptographic erase command to the storage device (s). For example, in various embodiments, the sanitize cryptographic erase command may be issued by the BIOS or UEFI firmware, by an HBA or RAID controller, or by the system BMC. In some embodiments, the BIOS or UEFI firmware may send the sanitize cryptographic erase command to an HBA or RAID controller, which may direct each of the targeted storage device(s) to perform a sanitize cryptographic erase operation using a proprietary command. In other embodiments, the BIOS or UEFI firmware may send a sanitize cryptographic erase command directly to the targeted storage device(s).

Method 700 may include the storage device(s) performing, or at least attempting to perform, the requested sanitize cryptographic erase operation(s) in response to the sanitize cryptographic erase command, and returning respective indications of success to the requestor, as in 718. Upon completion of the sanitize cryptographic erase operation(s), method 700 may include, at 720, putting storage device(s) into the frozen sanitize cryptographic erase disabled state. In at least some embodiments, the storage devices may be configured to put themselves into the frozen sanitize cryptographic erase disabled state upon completion of the sanitize cryptographic erase operation(s). For example, each storage device that implements sanitize cryptographic erase operations may include an indicator that, when set, causes cryptographic erasure of the storage device to be disabled, and this indicator may be settable only once subsequent to each power-on event or reboot event. In such embodiments, the storage device may set the indicator following completion of a sanitize cryptographic erase operation attempt, regardless of whether or not the attempt is successful.

In at least some embodiments of the present disclosure, protection mechanisms may be implemented in a trusted pre-OS environment in server and storage solution architectures. These mechanisms may allow for legitimate cryptographic erase operations while preventing the accidental or malicious cryptographic erasure of data on a variety of storage devices. By applying the techniques disclosed herein, user data may be protected without the implementation of a managed security protocol in the storage devices. Results similar to those achieved when using a managed protocol have been achieved using the techniques described herein without incurring the overhead of a managed security protocol at the device level and without incurring the overhead and cost of system management software to manage device-level passwords and protocols. The storage devices in systems that employ the techniques disclosed herein may be repurposed when there is a legitimate reason to do so without the risk of unintended or malicious loss of user data.

Note that while in several of the example systems described herein, the storage devices support a particular SANITIZE DEVICE feature set that includes a CRYPTOGRAPHIC SCRAMBLE type SANITIZE operation, in other embodiments, the techniques described herein for preventing malicious cryptographic erasure of storage devices may be applied to the protection of data stored on other types of storage devices, including storage devices that implement different cryptographic erase mechanisms.

As described above, an information handling system may, in some embodiments, implement systems and methods for preventing malicious cryptographic erasure of storage devices. The information handling system may implement techniques to detect a power-on event, to determine whether an authorized cryptographic erase operation of a storage device that implements cryptographic erasure is pending and, during a power-on initialization sequence, to send to the storage device in response to determining that no such operation is pending, a command to disable cryptographic erasure on the storage device. The command may set an indicator on the storage device that, when set, disables cryptographic erasure. In response to determining that an authorized cryptographic erase operation is pending, the information handling system may refrain from sending the command to disable cryptographic erasure on the device, and may send a command to the storage device to cause the pending operation to be performed. In response to receiving an indication of completion of the pending operation, the information handling system may clear an indicator that an authorized cryptographic erase operation is pending and initiate a power-on or reboot event.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system for preventing malicious cryptographic erasure of storage devices, comprising:
   An interface to couple the information handling system to a storage device comprising circuitry to implement cryptographic erasure; and
   circuitry to:
      detect a first power-on event; and
      perform, in response to detection of the first power-on event, a power-on initialization sequence, including circuitry to:
         determine whether a cryptographic erase operation directed to the storage device that was requested and authorized prior to detection of the first power-on event and while the information handling system was in a state in which requests to perform cryptographic erase operations on the storage device are not acted on is pending, wherein an authorized cryptographic erase operation is a cryptographic erase operation that has been determined to have been received from an authenticated entity; and send, to the storage device over the interface in response to a determination that there is no pending cryptographic erase operation that was requested and authorized prior to detection of the first power-on event and while the information handling system was in a state in which requests to perform cryptographic erase operations on the storage device are not acted on, a command to disable cryptographic erasure of the storage device by cryptographic erase operations received subsequent to receipt of the command to disable cryptographic erasure of the storage device and prior to a second power-on event or a reboot event that occurs subsequent to the first power-on event.

2. The information handling system of claim 1, further comprising circuitry to:

refrain from sending the command to disable cryptographic erasure of the storage device in response to a determination that a cryptographic erase operation that was requested and authorized prior to detection of the first power-on event and while the information handling system was in a state in which requests to perform cryptographic erase operations on the storage device are not acted on is pending.

3. The information handling system of claim 2, further comprising circuitry to:

send, from a trusted system entity to the storage device in response to the determination that a cryptographic erase operation that was requested and authorized prior to detection of the first power-on event and while the information handling system was in a state in which requests to perform cryptographic erase operations on the storage device are not acted on is pending, a command to cause the storage device to perform the pending cryptographic erase operation.

4. The information handling system of claim 3, further comprising circuitry to:

receive an indication that the pending cryptographic erase operation has completed;

clear an indicator that a cryptographic erase operation that was requested and authorized prior to detection of the first power-on event and while the information handling system was in a state in which requests to perform cryptographic erase operations on the storage device are not acted on is pending in response to receipt of the indication that the pending cryptographic erase operation has completed; and initiate a power-on event or a reboot event.

5. The information handling system of claim 1, wherein:
the information handing system further comprises circuitry to:

receive, prior to detecting the first power-on event, a request to perform a cryptographic erase operation while the information handling system is in a state in which requests to perform cryptographic erase operations are not acted on;

determine whether the request was received from an authenticated entity;

set an indicator that a cryptographic erase operation that was requested and authorized while the information handling system was in a state in which requests to perform cryptographic erase operations are not acted on is pending in response to a determination that the request was received from an authenticated entity;

refrain from setting the indicator that a cryptographic erase operation that was requested and authorized while the information handling system was in a state in which requests to perform cryptographic erase operations are not acted on is pending in response to a failure to authenticate the entity from which the request was received;

the circuitry to determine whether a cryptographic erase operation directed to the storage device that was requested and authorized prior to detection of the first power-on event and while the information handling system was in a state in which requests to perform cryptographic erase operations on the storage device are not acted on is pending includes circuitry to determine whether the indicator that a cryptographic erase operation that was requested and authorized while the information handling system was in a state in which requests to perform cryptographic erase operations are not acted on is pending is set.

6. The information handling system of claim 5, wherein:
the storage device is one of a plurality of storage devices coupled to the information handling system; and
the request comprises a request to perform a cryptographic erase operation on two or more of the storage devices.

7. The information handling system of claim 1, wherein the command to disable cryptographic erasure of the storage device by cryptographic erase operations received subsequent to receipt of the command to disable cryptographic erasure of the storage device and prior to the second power-on event or a reboot event that occurs subsequent to the first power-on event comprises a command to set an indicator on the storage device, wherein when set, the indicator on the storage device causes cryptographic erasure of the storage device to be disabled, and wherein the indicator on the storage device is settable only once subsequent to each power-on event or reboot event.

8. The information handling system of claim 1, wherein the command to disable cryptographic erasure of the storage device by cryptographic erase operations received subsequent to receipt of the command to disable cryptographic erasure of the storage device and prior to the second power-on event or a reboot event that occurs subsequent to the first power-on event is issued to the storage device by a trusted system entity.

9. A method for preventing malicious cryptographic erasure of storage devices in an information handling system, comprising:

detecting a first power-on event; and performing, in response to detecting the first power-on event, a power-on initialization sequence, including:

determining whether a cryptographic erase operation directed to a storage device that was authorized prior to detection of the first power-on event and while the information handling system was in a state in which requests to perform cryptographic erase operations on the storage device are not acted on is pending, wherein an authorized cryptographic erase operation is a cryptographic erase operation that has been determined to have been received from an authenticated entity; and sending, to the storage device in response to determining that there is no pending cryptographic erase operation that was authorized prior to detection of the first power-on event and while the information handling system was in a state in which requests to perform cryptographic erase operations on the storage device are not acted on, a command to disable cryptographic erasure of the storage device by cryptographic erase operations received subsequent to receipt of the command to disable cryptographic erasure of the storage device and prior to a second power-on event or a reboot event that occurs subsequent to the first power-on event.

10. The method of claim 9, further comprising:

detecting the second power-on event;

determining that a cryptographic erase operation directed to the storage device and authorized prior to detection of the second power-on event and while the information handling system was in a state in which requests to perform cryptographic erase operations on the storage device are not acted on is pending; and refraining from sending a command to disable cryptographic erasure of the storage device in response to determining that a cryptographic erase operation that was authorized prior to detection of the second power-on event and while the information handling system was in a state in which requests to perform cryptographic erase operations on the storage device are not acted on is pending.

11. The method of claim 10, further comprising:

sending, from a trusted system entity to the storage device in response to determining that a cryptographic erase operation that was authorized prior to detection of the second power-on event and while the information handling system was in a state in which requests to perform cryptographic erase operations on the storage device are not acted on is pending, a command to cause the storage device to perform the pending cryptographic erase operation.

12. The method of claim 11, further comprising:

receiving an indication that the pending cryptographic erase operation has completed;

clearing an indicator that a cryptographic erase operation that was authorized prior to detection of the second power-on event and while the information handling system was in a state in which requests to perform cryptographic erase operations on the storage device are not acted on is pending in response to receiving the indication that the pending cryptographic erase operation has completed; and initiating a power-on event or a reboot event.

13. The method of claim 10, wherein:

the method further comprises, prior to detecting the second power-on event:

receiving a request to perform a cryptographic erase operation while the information handling system is in a state in which requests to perform cryptographic erase operations are not acted on;

determining whether the request was received from an authenticated entity; and setting an indicator that a cryptographic erase operation that was authorized while the information handling system was in a state in which requests to perform cryptographic erase operations on the storage device are not acted on is pending in response to authenticating the entity from which the request was received; and determining that a cryptographic erase operation directed to the storage device and authorized prior to detection of the second power-on event and while the information handling system was in a state in which requests to perform cryptographic erase operations on the storage device are not acted on is pending includes determining whether the indicator that a cryptographic erase operation that was authorized while the information handling system was in a state in which requests to perform cryptographic erase operations on the storage device are not acted on is pending is set.

14. The method of claim 13, wherein:

the storage device is one of a plurality of storage devices in the information handling system; and the request comprises a request to perform a cryptographic erase operation on two or more of the storage devices.

15. The method of claim 9, wherein:

the method further comprises, prior to detecting the first power-on event:

receiving a request to perform a cryptographic erase operation while the information handling system is in a state in which requests to perform cryptographic erase operations are not acted on;

determining whether the request was received from an authenticated entity; and refraining from setting an indicator that a cryptographic erase operation that was authorized while the information handling system was in a state in which requests to perform cryptographic erase operations on the storage device are not acted on is pending in response to a failure to authenticate the entity from which the request was received; and determining whether a cryptographic erase operation directed to the storage device that was authorized prior to detection of the first power-on event and while the information handling system was in a state in which requests to perform cryptographic erase operations on the storage device are not acted on is pending includes determining whether the indicator that a cryptographic erase operation that was authorized while the information handling system was in a state in which requests to perform cryptographic erase operations on the storage device are not acted on is pending is set.

16. The method of claim 9, wherein the command to disable cryptographic erasure of the storage device by cryptographic erase operations received subsequent to receipt of the command to disable cryptographic erasure of the storage device and prior to the second power-on event or a reboot event that occurs subsequent to the first power-on event comprises a command to set an indicator on the storage device, wherein when set, the indicator on the storage device causes cryptographic erasure of the storage device to be disabled, and wherein the indicator on the storage device is settable only once subsequent to each power-on event or reboot event.

17. The method of claim 9, wherein the command to disable cryptographic erasure of the storage device by cryptographic erase operations received subsequent to receipt of the command to disable cryptographic erasure of the storage device and prior to the second power-on event or a reboot event that occurs subsequent to the first power-on event is issued to the storage device by a trusted system entity.

18. A system for preventing malicious cryptographic erasure of storage devices, comprising:
- a storage device comprising circuitry to implement cryptographic erasure;
- one or more processors;
- at least one non-transitory computer-readable storage medium storing program instructions that when executed by the one or more processors cause the processors to perform:
  - determining that a first power-on event has occurred; and
  - performing, in response to determining that the first power-on event has occurred, a power-on initialization sequence, including:
    - determining whether a cryptographic erase operation directed to the storage device that was requested and authorized prior to detection of the first power-on event and while the information handling system was in a state in which requests to perform cryptographic erase operations on the storage device are not acted on is pending, wherein an authorized cryptographic erase operation is a cryptographic erase operation that has been determined to have been received from an authenticated entity; and
    - sending, to the storage device in response to a determination that there is no pending cryptographic erase operation that was requested and authorized prior to detection of the first power-on event and while the information handling system was in a state in which requests to perform cryptographic erase operations on the storage device are not acted on, a command to disable cryptographic erasure of the storage device by cryptographic erase operations received subsequent to receipt of the command to disable cryptographic erasure of the storage device and prior to a second power-on event or a reboot event that occurs subsequent to the first power-on event.

19. The system of claim 18, wherein when executed by the one or more processors, the program instructions cause the one or more processors to perform:
- refraining from sending the command to disable cryptographic erasure of the storage device in response to a determination that a cryptographic erase operation that was requested and authorized prior to detection of the first power-on event and while the information handling system was in a state in which requests to perform cryptographic erase operations on the storage device are not acted on is pending.

20. The system of claim 18, wherein:
- wherein when executed by the one or more processors, the program instructions cause the one or more processors to perform:
  - receiving, prior to determining that the first power-on event has occurred, a request to perform a cryptographic erase operation while the information handling system is in a state in which requests to perform cryptographic erase operations are not acted on;
  - determining whether the request was received from an authenticated entity;
  - setting an indicator that a cryptographic erase operation that was requested and authorized while the information handling system was in a state in which requests to perform cryptographic erase operations are not acted on is pending in response to a determination that the request was received from an authenticated entity; and
  - refraining from setting the indicator that a cryptographic erase operation that was requested and authorized while the information handling system was in a state in which requests to perform cryptographic erase operations are not acted on is pending in response to a failure to authenticate the entity from which the request was received; and
- determining whether a cryptographic erase operation directed to the storage device that was requested and authorized prior to detection of the first power-on event and while the information handling system was in a state in which requests to perform cryptographic erase operations on the storage device are not acted on is pending includes determining whether the indicator that a cryptographic erase operation that was requested and authorized while the information handling system was in a state in which requests to perform cryptographic erase operations are not acted on is pending is set.

* * * * *